Patented June 26, 1923.

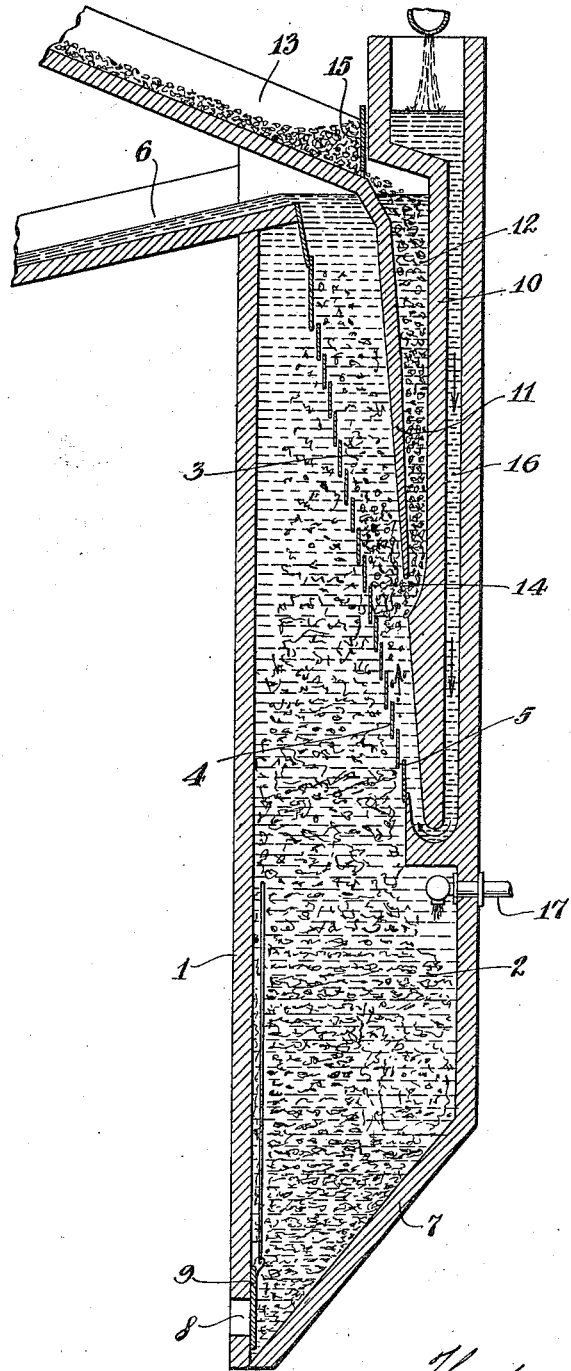

1,459,922

UNITED STATES PATENT OFFICE.

THEODORE NAGEL, OF BROOKLYN, NEW YORK.

METHOD OF AND APPARATUS FOR THE HYDRODYNAMIC SEPARATION OF PARTICLES.

Application filed March 4, 1922. Serial No. 540,958.

*To all whom it may concern:*

Be it known that I, THEODORE NAGEL, a citizen of the United States, and a resident of the borough of Brooklyn, county of Kings, and city and State of New York, have invented certain new and useful Improvements in Methods of and Apparatus for the Hydrodynamic Separation of Particles, of which the following is a specification.

My invention is directed to an improved method of and apparatus for effecting the hydrodynamic separation of some of the particles from a mixture of particles and is adapted for use in connection with the separation of particles of different sizes or of different specific gravities or of different specific gravities and sizes.

This invention is an improvement on the invention of my prior application Serial No. 513,236 filed November 7, 1921, on an improved method of and apparatus for the hydrodynamic separation of particles in which application I have fully explained the theory on which that invention and the present one are based.

In the specific illustration of an application of my improved method to be hereinafter described I will refer to the separation of coal from free-ash contained in the water from a coal washery and water will be referred to as the liquid medium employed in the practice of my improved method but it is to be understood that this is by way of illustration only inasmuch as other liquids than water may be employed and solids other than coal and free-ash may be separated with equal facility.

As I have pointed out in my previous application above referred to, a liquid body moving upwardly in a direction inclined from the vertical has a vertical and a horizontal component of velocity of flow and if a particle or a mixture of particles be projected into such an upwardly moving liquid body this upwardly moving liquid body will impart to such particles a vertical component and a horizontal component of velocity with the result that if the velocity of flow and direction of motion of all of the particles of the mixture at the outset is substantially the same, the vertical component of the velocity of flow of the lighter particles becomes greater than the vertical component of the velocity of flow of the heavier particles. It is possible, therefore, by providing suitable apparatus to effect the desired separation of the particles by causing or permitting the faster moving particles to pass upwardly and overflow with the upwardly moving liquid body while the slower moving particles, due to the horizontal component of velocity imparted to them by the upwardly moving liquid, pass out of the treating chamber and into what I shall hereinafter term a settling chamber adjacent thereto.

In my prior application above referred to the mixture of particles to be treated, together with the liquid employed in effecting the separation, were fed into and upwardly through a treating chamber simultaneously through a quiescent liquid body. In the present invention, however, I find it expedient to project the liquid—water for example—upwardly and into the treating chamber separately from the mixture of particles to be treated which I here introduce into the treating chamber and into the upwardly moving liquid at an angle to the direction of motion of the upwardly moving liquid.

As will be seen from the detailed description of my invention the upward velocity of the moving liquid body is to be so controlled or regulated as to carry some of the particles upwardly and off with the upwardly moving liquid body while causing the other particles of the mixture to move across, through and out of the upwardly moving liquid body and at an angle thereto.

It will be seen also that due to the fact that the upwardly moving liquid body is moving in a direction inclined from the vertical and due to the manner in which the mixture to be treated is introduced into this upwardly moving liquid body, all of the particles will be caused to travel in a direction inclined from the vertical due to the horizontal component of the force imparted by the upwardly moving liquid which as just pointed out is inclined from the vertical.

In the accompanying drawing I have illustrated in sectional elevation an apparatus suitable for the practice of my improved method.

This apparatus comprises a tank 1 divided substantially vertically into two chambers, a settling chamber 2 and a treating chamber 3, by means of a partition 4 slightly inclined from the vertical, the area of the chamber 3 gradually increasing from bottom to top. This partition is provided with openings 5 for establishing communication at all times between the treating chamber and the settling chamber and for permitting the discharge of material from the treating chamber into the settling chamber as will be pointed out hereinafter. The top of the tank is provided with overflow 6 which is in communication only with the treating chamber 3. The bottom of the tank 1 is preferably inclined as indicated at 7 and is provided near the bottom with a discharge opening 8 controlled by a gate 9 so that material settling in the chamber 2 may be removed.

Extending into the treating chamber 3 is a device designated 10, the wall 11 thereof being spaced from the partition 4 and if desired extending parallel therewith. The device 10 is provided with a feed channel 12 in communication with a feed chute or hopper 13 at the top of the tank 1, the lower end of the feed channel opening into the treating chamber at the side thereof as indicated at 14. This feed channel is provided for the purpose of introducing material to be treated into the treating chamber 2, passage of material from the chute or hopper 13 to this feed channel being controlled by a gate 15.

The device 10 is also provided with a liquid supply channel 16 for supplying water or other liquid to the treating chamber and for forcing this liquid upwardly through the treating chamber and between the wall 11 of the device 10 and the partition 4. 17 is a water connection to the settling chamber 2 for replenishing therein the water drawn off with the settled material.

It will be seen from the drawing that the channel 16 is so arranged with respect to the partition 4 that the water or other liquid employed is projected upwardly through the treating chamber 3 from a point adjacent the bottom of the partition and it will be seen also that this liquid in moving upwardly passes the discharge opening 14 of the feed channel 12 so that the material to be treated which is fed through the feed channel 12 is projected into the upwardly moving liquid in the treating chamber at an angle to the direction of flow of the upwardly moving liquid.

It will be seen also that all parts of the apparatus are in hydrostatic and hydraulic communication at all times.

It will be apparent, of course, that if desired the channel 16 could be located outside of the tank 1 as well as the feed channel 12, the gist of this invention so far as the apparatus is concerned, being to feed the mixture to be treated and the liquid, which provides the force and is to effect the desired separation into the apparatus separately and to so locate the discharge openings of the feed channel with respect to the upwardly moving liquid body that the material will be projected into the upwardly moving liquid body at an angle to the direction of motion thereof.

Assuming now that the apparatus is filled with water, it will be apparent that water may be introduced into the apparatus through the channel 16 with sufficient head to force it upwardly through the treating chamber 3 to overflow at the top of the chamber, the water in the settling chamber 2 although in communication with the chamber 3 remaining in a quiescent state. If the gate 15 be operated to admit a mixture of the unclassified unseparated particles to be treated to the feed channel 12 this mixture will pass through the quiescent water in the feed channel 12 and be projected through the discharge opening 14 into the upwardly moving liquid in the treating chamber 3.

As I have above pointed out, the velocity of flow of the liquid moving upwardly through the treating chamber 3 is so controlled and regulated that some of the particles of the mixture projected into it are carried upward and overflow with the liquid.

Gravity and the vertical and horizontal component forces of the liquid moving upwardly inclined from the vertical impart resultant forces to those particles of the mixture which do not overflow at the top of the treating chamber forcing them to traverse or cross the upwardly moving liquid, and to pass into the settling chamber 2 through the openings 5 provided for that purpose in the inclined partition 4.

I claim:

1. The method which consists in projecting an unclassified unseparated mixture of particles through and in contact with a quiescent liquid body to dilute the same and thereafter projecting the particles into an upwardly moving liquid body at an angle to the direction of motion of said upwardly moving liquid body while so controlling the velocity and direction of the upwardly moving liquid as to cause the particles of one material to be carried upwardly with the upwardly moving liquid body and the particles of the other material to traverse or cross the upwardly moving liquid and to pass out of the same.

2. The hydrodynamic method of classifying and separating the particles of an unclassified unseparated mixture of particles, which method consists in passing the mixture into and at an angle to a liquid body travelling vertically in an upward direction and controlling the velocity and direction of the upwardly moving liquid body to cause the particles of one class of material to pass out of the moving liquid while the other particles are passed off with the moving liquid.

3. In an apparatus of the class described the combination of a tank, a partition therein slightly inclined from the vertical for dividing the tank substantially vertically into a treating chamber and a settling chamber, the area of the treating chamber gradually increasing from bottom to top, said partition being provided with openings for the passage of material from the treating chamber to the settling chamber, a device projecting into said treating chamber and provided with a feed channel through which material to be treated is fed to said treating chamber and means in direct communication with the treating chamber for forcing a liquid upwardly through the treating chamber in a direction to effectively produce hindered settling.

4. In an apparatus of the class described the combination of a tank, a partition for dividing the tank vertically into a treating chamber and a settling chamber, said partition being provided with openings for establishing communication between the two chambers at all times, a device in said tank provided with a feed channel for feeding material to be treated into said treating chamber, means for forcing a stream of liquid upwardly through the treating chamber past the discharge end of said feed channel and between it and said partition whereby material passed into the treating chamber will be projected into and at an angle to a liquid body moving upwardly in said treating chamber.

5. In an apparatus of the class described, the combination of a tank, a partition therein for dividing the tank into a treating chamber and a settling chamber, said partition being provided with openings for establishing communication between the two chambers at all times, a device projecting into said treating chamber and spaced from the bottom thereof and from said partition, means for forcing a liquid upwardly through said apparatus and between the side of said device and said partition, said device being provided with a feed channel communicating with the treating chamber, opening into the treating chamber above the entrance into the treating chamber of the upwardly moving liquid.

6. In an apparatus of the class described, the combination of a tank, an inclined partition therein for dividing the tank into a treating chamber and a settling chamber, said partition being provided with openings for establishing communication between the treating chamber and the settling chamber at all times, a device extending into the treating chamber and provided with means for forcing a liquid stream upwardly through the treating chamber and with a feed channel for feeding material to be treated to the treating chamber, said feed channel opening into the treating chamber above the entrance of the upwardly moving liquid into the treating chamber, and a liquid in said apparatus substantially filling the same, all parts of the apparatus being in hydrostatic and hydraulic communication.

This specification signed this 3rd day of March, 1922.

THEODORE NAGEL.